(12) United States Patent
Tsirkin et al.

(10) Patent No.: US 12,436,790 B2
(45) Date of Patent: Oct. 7, 2025

(54) SCALABLE ASYNCHRONOUS COMMUNICATION FOR ENCRYPTED VIRTUAL MACHINES

(71) Applicant: Red Hat, Inc., Raleigh, NC (US)

(72) Inventors: Michael Tsirkin, Yokneam Illit (IL); Karen Noel, Pembroke, NH (US)

(73) Assignee: Red Hat, Inc., Raleigh, NC (US)

( * ) Notice: Subject to any disclaimer, the term of this patent is extended or adjusted under 35 U.S.C. 154(b) by 692 days.

(21) Appl. No.: 17/727,187

(22) Filed: Apr. 22, 2022

(65) Prior Publication Data

US 2023/0342172 A1     Oct. 26, 2023

(51) Int. Cl.
*G06F 9/455*     (2018.01)
*G06F 12/14*     (2006.01)

(52) U.S. Cl.
CPC ...... *G06F 9/45558* (2013.01); *G06F 9/45545* (2013.01); *G06F 12/1408* (2013.01); *G06F 12/145* (2013.01); *G06F 2009/45583* (2013.01); *G06F 2009/45587* (2013.01)

(58) Field of Classification Search
CPC . G06F 2009/45583; G06F 2009/45587; G06F 21/53
See application file for complete search history.

(56) References Cited

U.S. PATENT DOCUMENTS

| | | | |
|---|---|---|---|
| 8,868,908 B2 | 10/2014 | MacMillan et al. | |
| 9,250,969 B2* | 2/2016 | Lagar-Cavilla | G06F 9/5016 |
| 9,710,400 B2 | 7/2017 | Chaturvedi et al. | |
| 10,592,434 B2 | 3/2020 | Sliwa et al. | |
| 10,956,321 B2 | 3/2021 | Ferguson et al. | |
| 2013/0219387 A1 | 8/2013 | Moeller et al. | |
| 2016/0132345 A1* | 5/2016 | Bacher | G06F 21/57 718/1 |
| 2017/0149807 A1* | 5/2017 | Schilling | G06F 21/53 |
| 2020/0287709 A1* | 9/2020 | Bradbury | H04L 9/3239 |
| 2022/0035750 A1* | 2/2022 | O'Brien, III | G06F 12/0646 |

OTHER PUBLICATIONS

Kashefi et al., "ZIVM: A Zero-Copy Inter-VM Communication Mechanism for Cloud Computing", School of Computer Engineering, Iran University of Science and Technology, Nov. 6, 2011, 11 pages https://www.researchgate.net/publication/220099586_ZIVM_A_Zero-Copy_Inter-VM_Communication_Mechanism_for_Cloud_Computing.

(Continued)

*Primary Examiner* — Lewis A Bullock, Jr.
*Assistant Examiner* — Carlos Alberto Espana
(74) *Attorney, Agent, or Firm* — Dority & Manning, P.A.

(57) ABSTRACT

Systems and methods for virtual machine communication in a virtualized environment can include identifying an encrypted guest memory location of a virtual machine (VM), the encrypted guest memory location associated with a virtual device, and copying a first set of encrypted data from the encrypted guest memory location to hypervisor memory to create a copied set of encrypted data. They can also include comparing a second set of encrypted data from the encrypted guest memory location with the copied set of encrypted data, and responsive to detecting a difference between the second set of encrypted data and the copied set of encrypted data, requesting, unencrypted data comprising a request related to the virtual device.

20 Claims, 6 Drawing Sheets

(56) References Cited

OTHER PUBLICATIONS

Wang et al., "Research on Asynchronous Inter-VM Communication Mechanism Based on Embedded Hypervisor", School of Computer Science and Engineering Beihang University China, 2018, 6 pages https://www.researchgate.net/publication/326103647.

Shinjo et al., "Fast Networking with Socket-Outsourcing in Hosted Virtual Machine Environments", Department of Computer Science University of Tsukuba, Japan; College of Computing Georgia Institute of Technology Atlanta, USA, Jan. 2009, 9 pages https://www.researchgate.net/publication/220999398.

* cited by examiner

SCALABLE ASYNCHRONOUS COMMUNICATION FOR ENCRYPTED VIRTUAL MACHINES

TECHNICAL FIELD

The disclosure is generally related to virtualization systems, and is more particularly related to communication with encrypted virtual machines.

BACKGROUND

Virtualization is a computing technique that improves system utilization, decoupling applications from the underlying hardware, and enhancing workload mobility and protection. Virtualization may be realized through the implementation of virtual machines (VMs). A VM is a portion of software that, when executed on appropriate hardware, creates an environment allowing the virtualization of a physical computer system (e.g., a server, a mainframe computer, etc.). The physical computer system is typically referred to as a "host machine," and the operating system of the host machine is typically referred to as the "host operating system." A virtual machine may function as a self-contained platform, executing its own "guest" operating system and software applications.

Typically, software on the host machine known as a "hypervisor" (or a "virtual machine monitor") manages the execution of one or more virtual machines, providing a variety of functions such as virtualizing and allocating resources, context switching among virtual machines, backing up the state of virtual machines periodically in order to provide disaster recovery and restoration of virtual machines, and so on. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses. Device and input/output (I/O) virtualization involves managing the routing of I/O requests between virtual devices and the shared physical hardware.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Implementations of the disclosure are directed to virtual machine systems for communication with encrypted virtual machines.

Various computer systems can trusted execution environments (TEEs) to enhance the isolation of data of a computing process from other processes executing on the computer system. A TEE can use hardware-based encryption to encrypt the data of a lower privileged process so that higher privileged computing processes would not have access to the data in an unencrypted form. This enables a lower privileged process to isolate its data from the higher privileged processes even though the higher privileged processes can be responsible for managing the data.

Encrypted virtual machine memory is a technology supported by TEEs, in which guest memory of the virtual machine is protected from the hypervisor through encryption. In most cases, not all of the guest memory needs to be encrypted, so the virtual machine can control which memory is encrypted by means of marking memory as unencrypted or encrypted in guest memory (i.e., guest controlled guest page tables), which can be used by a virtual central processing unit (vCPU) for translation of guest virtual addresses to guest physical addresses. The guest physical addresses may then be translated by the host to host physical addresses.

Computer systems can use cryptographic functions to encrypt data stored on a storage device. In some examples, the cryptographic function may be performed by a combination of hardware and lower-level code (e.g., firmware) and may use cryptographic keys that may be concealed from higher-level code (e.g., hypervisor). The higher-level executable code may request the data and the hardware may or may not decrypt the data before fulfilling the request for the data. For example, if the data is associated with a VM, then a request by the guest operating system of the virtual machine may be fulfilled with a decrypted version of the data but a request from the hypervisor may be fulfilled with an encrypted version of the data.

Accordingly, in many situations the VM guest memory is encrypted and not accessible by the hypervisor. One approach allowing VMs to communicate with the hypervisor directly involves paravirtualization. Paravirtualization is a technique which refers to having a modified guest operating system (OS) that disables encryption for a portion of the VM guest memory and thereby makes it directly accessible to the hypervisor. This enables the hypervisor to access and store data directly in the unencrypted portion of the guest memory.

For example, in some cases, when virtual machines use virtual devices, a portion of the guest memory can be used by the virtual machine for communication with the virtual devices. Since the virtual devices can be implemented by the hypervisor, the hypervisor have access to the portion of guest memory for memory writing or reading operations associated with the virtual device. For example, the hypervisor can access the portion of guest memory to write, into the guest memory, data received by the virtual device (e.g., a virtual storage drive, a virtual network interface controller (vNIC), etc.), or to read, from the guest memory, data to be sent to the virtual device. Similarly, the hypervisor can access portions of guest memory for other virtual devices. Accordingly, in certain situation some portion of guest memory can remain unencrypted for the hypervisor to be able to utilize it. However, this entails modifications to the OS of the VM and constrains the range of software that can be used on the VMs.

Another approach allowing VMs to communicate with the hypervisor without modifying the guest OS involves executing a program within the VM (e.g., VM guest firmware or a guest agent) which can copy data from encrypted to unencrypted memory. For example, a guest agent can be executed to copy data from an encrypted memory location associated with a virtual device to an unencrypted memory location to make it accessible to a hypervisor. The hypervisor can be notified (e.g., via a hypercall) that data is available (e.g., data related to a virtual device request) in an unencrypted memory location. In some cases, where the hypervisor is running on a different physical CPU than the CPU on which the VM is running, the hypervisor can execute a program (e.g., guest firmware or guest agent) that can copy the data from an encrypted memory location to an unencrypted memory location and thereafter notify (e.g., via a hypercall to the hypervisor) the hypervisor that the unencrypted data is available for the hypervisor. However, this approach entails recurring iterations of execution of a program that makes unencrypted copies of encrypted data regardless of whether the data includes any new changes pertaining to the virtual device. Accordingly, this leads to a waste of processing and memory resources that create additional expenses related to running the virtualized system. Thus, the existing approaches entail undesirable modifications to guest OSs or excessive strain on available resources leading to inefficient asynchronous communication between VMs and the hypervisor.

Aspects of this disclosure address the above and other deficiencies by providing a mechanism for efficient communication with virtual machine systems when changes are detected in memory locations associated with a virtual memory device. In accordance with implementations of this disclosure, a virtualization system can conserve resources by obtaining virtual device requests when changes are detected in encrypted memory associated with a virtual device. In various implementations, VM guest OS communicate with virtual devices by placing requests (e.g., descriptors) in the guest memory of the VM. When data is modified in certain guest memory locations (e.g., encrypted memory locations associated with a virtual device or with virtual device requests), the encrypted data observable by the hypervisor (i.e., via the host CPU) is also modified. For example, a request by a VM guest OS made to a virtual device (e.g., a request to access, edit, save data) can generate a change in the encrypted data in the encrypted memory location associated with the virtual device. Although, the hypervisor (i.e., via the host CPU) is only able to see the encrypted version of the data, it can nevertheless observe the change in the encrypted data.

Accordingly, in some implementations of the present disclosure, a hypervisor of a virtualization system can map a portion of encrypted memory (e.g., an encrypted memory location associated with a virtual device) to hypervisor memory. Further, the hypervisor can access the encrypted data and create a copy of the encrypted data in hypervisor memory. This access can occur periodically (e.g., upon an external signal, timeout, or at predetermined time intervals). The hypervisor can compare the encrypted data with the data previously copied into hypervisor memory to detect any changes (e.g., changes in the encrypted memory location related to the virtual device that are likely to indicate that a request related to the virtual device has been recorded by the VM guest) that have been made to the encrypted data.

Upon detection of a change, the hypervisor can execute a program (e.g., guest firmware or guest agent) that can obtain the encrypted request from the encrypted memory location and copy it in unencrypted form to the unencrypted memory location from which it can be accessed by the hypervisor. In some implementations, a notification may be received by the hypervisor that the data is available to the hypervisor for access. The hypervisor can access the request in the unencrypted memory location and execute the request relating to the virtual device. In this manner, the drain on the host computer system resources can be reduced since the hypervisor can reduce the number of times attempts are made to access the memory location relating to the virtual device to those instances when changes to data contained there are detected. Furthermore, this can be performed without any changes made to the VM OS. These and other benefits of the implementations of the present disclosure can be understood in more detail with reference to FIG. 1.

Figure 1:
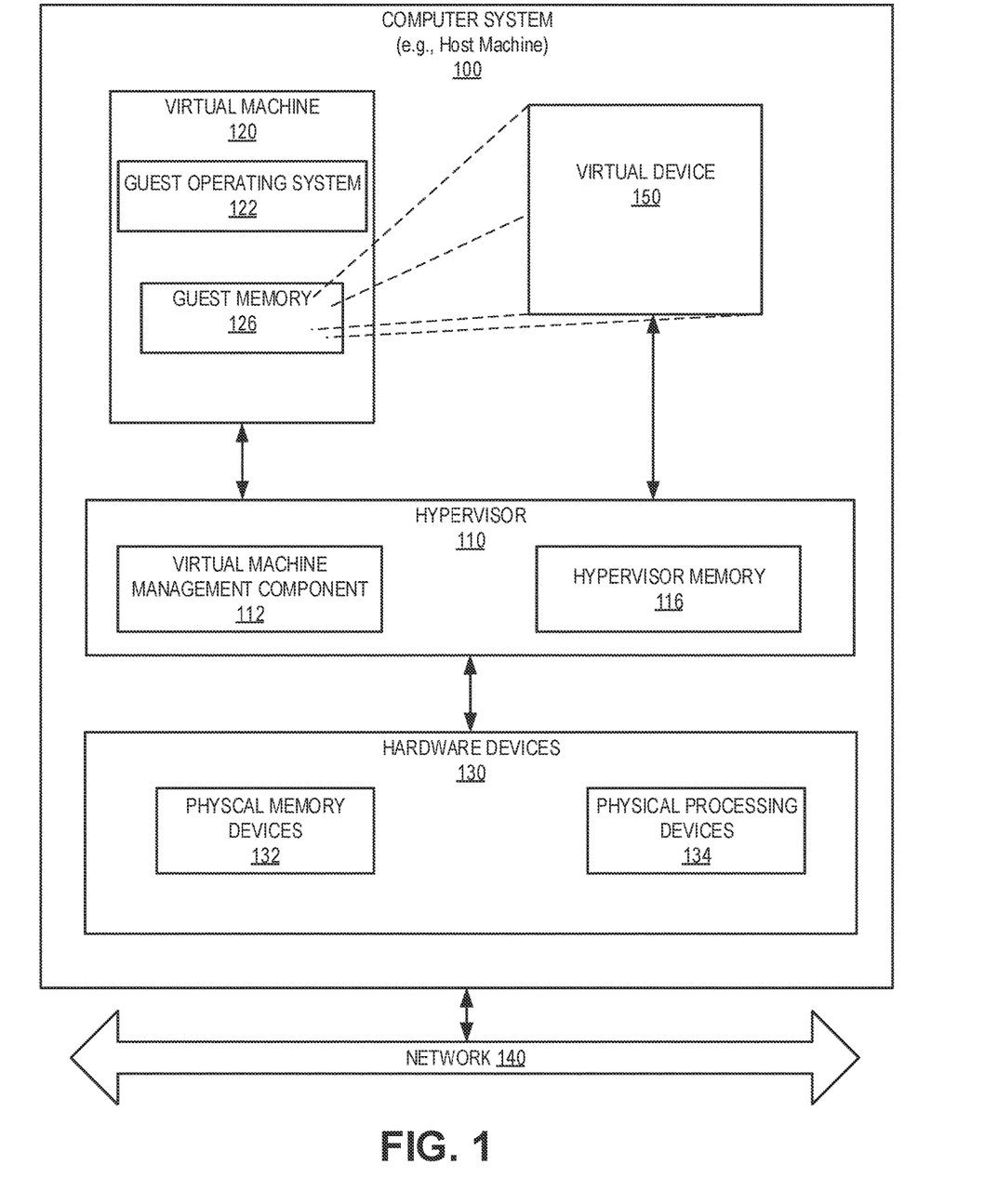
FIG. 1 depicts a high-level diagram of an example system architecture operating in accordance with one or more implementations of the present disclosure.

FIG. 1 depicts an illustrative architecture of elements of a computer system 100, in accordance with an implementation of the present disclosure. It should be noted that other architectures for computer system 100 are possible, and that the implementation of a computer system utilizing embodiments of the disclosure are not necessarily limited to the specific architecture depicted. Computer system 100 can be a single host machine (e.g., host computer system) or multiple host machines that may be arranged in a homogenous or non-homogenous group (e.g., cluster system, grid system, or distributed system). Computer system 100 can include a rackmount server, a workstation, a desktop computer, a notebook computer, a tablet computer, a mobile phone, a palm-sized computing device, a personal digital assistant (PDA), etc. In the implementation depicted in FIG. 1, computer system 100 can include hypervisor 110, virtual machine 120, virtual device 150, hardware devices 130, and network 140. For example, system 100 can be connected to a network 140 and comprises physical processing devices 134 (e.g., central processing units (CPUs)), physical memory devices 132, which can include volatile memory devices (e.g., random access memory (RAM)), non-volatile memory devices (e.g., flash memory), and/or other types of memory devices, and storage devices (e.g., a magnetic hard disk, a Universal Serial Bus (USB) solid state drive, a Redundant Array of Independent Disks (RAID) system, a network attached storage (NAS) array, etc.) that can serve as a secondary memory, interconnected as shown.

Computer system 100 can run a host operating system (OS), which can comprise software that manages the hardware resources of the computer system and that provides functions such as inter-process communication, scheduling, virtual memory management, and so forth. In some implementations, host operating system can run a hypervisor 110, which can provide a virtual operating platform for guest virtual machine (VM) 120 and manages its execution via the virtual machine management component 112. Virtual machine management component can be understood to perform (and enable the hypervisor to perform) all of the functions of the hypervisor including communication between the VM 120 and hypervisor 110, memory allocation and management, and communication between the VM 120 and virtual device 150. Virtual machine management component 112 can enable hypervisor 110 to configure a virtual machine to access the virtual data storage associated with that virtual machine as well as to access the data storage of the host machine (i.e., physical memory devices 132). In some implementations, the guest memory 126 can be encrypted memory that is accessible only to the virtual machine without being accessible to the hypervisor managing the virtual machines. Hypervisor 110 can manage virtual machine 120 and provide it with access to system resources. Hypervisor 110 can similarly create and manage one or more virtual devices 150 which can correspond to one or more hardware devices 130 or be entirely virtual instances emulating the functions of a device not physically present within computer system 100.

The hypervisor can include hypervisor memory 116 that can be used for performing the various functions of the hypervisor. VM 120 can be software implementation of a machine that executes programs as though it were an actual physical machine. VM 120 can have a corresponding guest operating system 122 that manages virtual machine resources and provides functions such as inter-process communication, scheduling, memory management, etc. VM 120 can perform asynchronous management of unencrypted memory locations within the guest memory 126 of the VM. Although, for simplicity, a single VM is depicted in FIG. 1, in some other implementations, computer system 100 can comprise multiple VMs.

As shown, hypervisor 110 can include a virtual machine management component that can create and manage the operation of the VM 120 including the execution of programs on the VM and accessing encrypted guest memory 126 locations. The hypervisor 110 can (e.g., through the virtual machine management component 112) map certain portions of guest memory 126 (i.e., portions of guest memory residing on encrypted memory locations in encrypted memory locations on physical memory devices 132) to hypervisor memory 116.

Physical processing devices 134 can include one or more processors that are capable of accessing physical memory devices 132 and executing instructions of the guest operating system 122 and of the hypervisor 110. Processing devices 134 can be a single core processor that is capable of executing one instruction at a time (e.g., single pipeline of instructions) or can be a multi-core processor that simultaneously executes multiple instructions. The instructions can encode arithmetic, logical, or I/O operations and can be used to execute a cryptographic function that performs encryption or decryption of data within physical memory devices 132. Processing devices 134 and physical memory devices 132 can interact with one another to store data in an encrypted form and provide access to the stored data in either an encrypted form or unencrypted form based on the context of the process attempting to access the data (e.g., VM process or hypervisor process).

In some implementations, the computer system 100 together with its constituent hardware devices 130 can be communicatively connected to network 140. Network 140 can be a public network (e.g., the internet), a private network (e.g., a local area network (LAN) or wide area network (WAN)), or a combination thereof. In one example, network 140 can include a wired or a wireless infrastructure, which can be provided by one or more wireless communications systems, such as a wireless fidelity (WiFi) hotspot connected with the network 140 and/or a wireless carrier system that can be implemented using various data processing equipment, communication towers, etc.

Accordingly, in some implementations of the present disclosure, the hypervisor (e.g., via the VM management component 112) can run a VM 120 and allocate memory resources to the VM 120 as well as to virtual device 150. This allocation of memory resources can include identification of memory space (e.g., on physical memory devices 132) to VM 120 to use for guest memory 126. Accordingly, the hypervisor can allocate portions of memory space that can be associated with virtual device 150. Portions of memory space associated with virtual device 150 can include portions of the encrypted guest memory 126 allocated for requests by VM guest OS 122 (e.g., requests to access, read, write, modify etc.). Thus, guest OS 122 can store multiple requests relating the virtual device 120 in an encrypted memory location of guest memory 126 (i.e., reflected as encrypted data stored in physical memory devices 132). As noted earlier, portions of the guest memory 126 can be encrypted and inaccessible to the hypervisor in unencrypted form. Moreover, both guest memory 126 and hypervisor memory 116 can be mapped to particular hardware memory locations (e.g., hardware resources of physical memory devices 132) such that the hypervisor can observe the encrypted data recorded by the guest OS 122. Thus, VM 120 can include in guest memory 126 some encrypted memory locations associated by the hypervisor with virtual device 150 and observable by the hypervisor in encrypted form. Such encrypted memory locations can be locations where VM guest OS 122 records requests related to the virtual device 150.

In some implementations, the hypervisor (e.g., via the VM management component 112) can access the physical memory devices 132 and copy a set of encrypted data from the encrypted guest memory 126 location associated with virtual device 150 to hypervisor memory 116 to create a copied set of encrypted data. The hypervisor can then again access the encrypted memory location (e.g., of guest memory 126) associated with the virtual device 150 and compare the set of encrypted data stored there with the preciously copied set of encrypted data to detect whether or not any changes have been made. Changes to encrypted data in a memory location associated with the virtual device 150 can include requests by the guest OS 122 related to the virtual device 150. In some implementations, the hypervisor 110 can periodically access the encrypted guest memory 126 location, and compare the encrypted data stored there with the copied set of encrypted data in hypervisor memory 116, to detect whether any change has been made to data in the encrypted guest memory location.

If changes to the data are detected (i.e., if there are differences between the data in the encrypted memory location associated with the virtual device 150 and the previously copied set of data stored in hypervisor memory 116), the hypervisor 110 can, in response, request to obtain the unencrypted data including the request relating to the virtual device 150 from the VM 120. For example, the hypervisor 110 can execute a program (e.g., guest firmware or guest agent) to copy the encrypted data in unencrypted form to an unencrypted memory location. In this manner, the hypervisor 110 can copy the data comprising the request related to the virtual device 150 from the encrypted guest memory location to an unencrypted memory location. The hypervisor 110, can then access the data including the request relating to the virtual device 150 in the unencrypted memory location.

In some implementations, the program (e.g., guest firmware or guest agent) after creating the unencrypted copy of the data including the request relating to the virtual device 150 in the unencrypted memory location can send a notification to the hypervisor 110 that the unencrypted data is available for access. Accordingly, hypervisor can, receive the notification indicating that unencrypted data comprising the request related to the virtual device 150 is available for the hypervisor and proceed to access the unencrypted data to execute the request.

Figure 2:
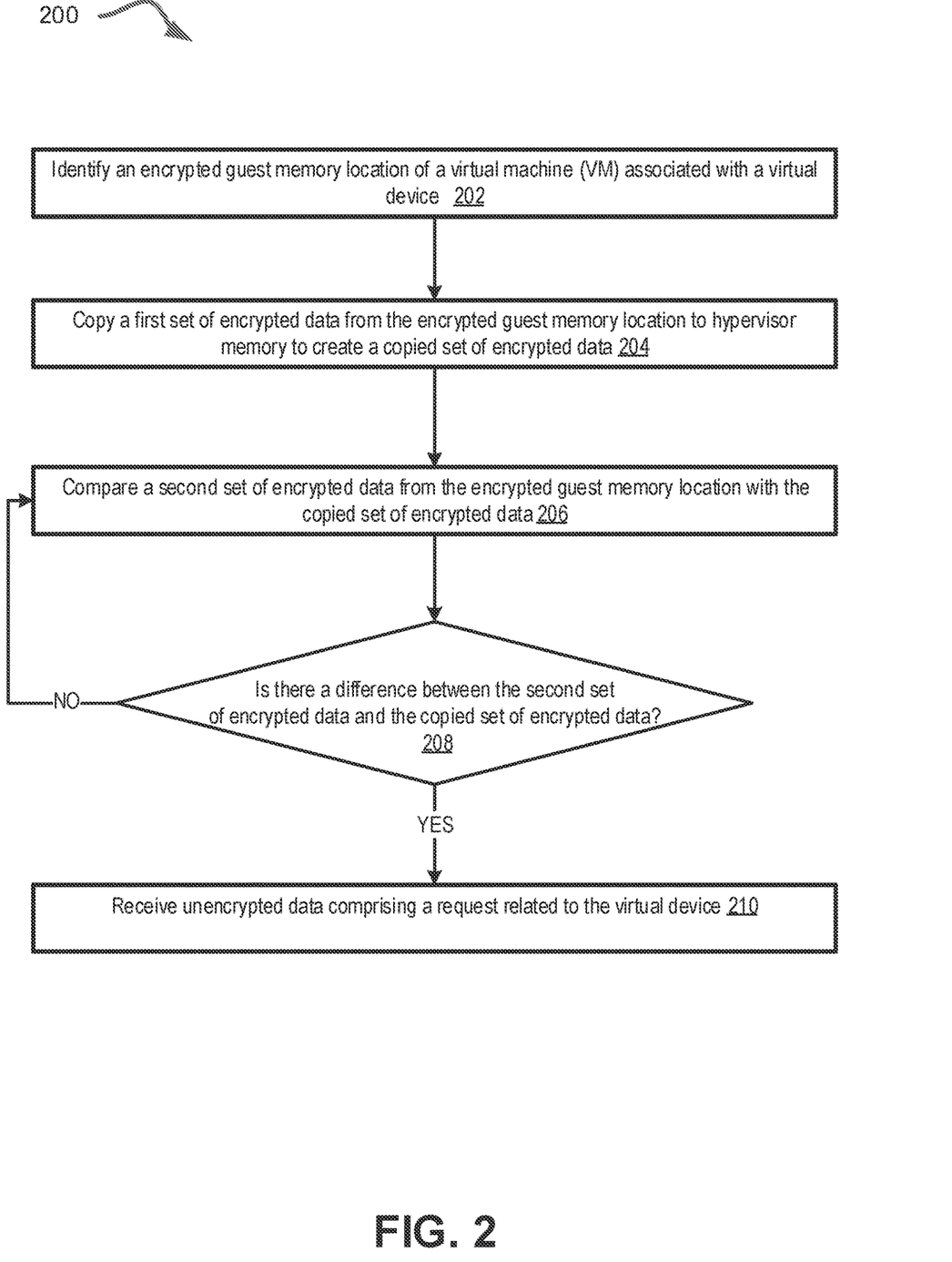
FIG. 2 is a flow diagram of an example method of communication for an encrypted virtual machine, in accordance with one or more implementations of the present disclosure.

FIG. 2 is a flow diagram of an example method of communication for an encrypted virtual machine, in accordance with one or more aspects of the present disclosure. Method 200 can be performed by processing logic that includes hardware (e.g., circuitry, dedicated logic, programmable logic, microcode, etc.), software (e.g., instructions run on a processor to perform hardware simulation), or a combination thereof. Method 200 or each of its individual functions, routines, subroutines, or operations can be performed by one or more processors of a computer system (e.g., the computer system 100 of FIG. 1) implementing the method. In an illustrative example, method 200 may be performed by a single processing thread. Alternatively, method 200 can be performed by two or more processing threads, each thread implementing one or more individual functions, routines, subroutines, or operations of the method. In an illustrative example, the processing threads implementing method 200 can be synchronized (e.g., using semaphores, critical sections, or other thread synchronization mechanisms). Alternatively, the processing threads implementing method 200 can be executed asynchronously with respect to each other. Therefore, while FIG. 2 and the associated description lists the operations of method 200 in certain order, various implementations of the method can perform at least some of the described operations in parallel or in arbitrary selected orders.

In some implementations, at block 202, the processing logic (e.g., the processing logic that generates or represents the hypervisor 110) can identify an encrypted guest memory location (i.e., a location in encrypted guest memory) of a VM, where the encrypted guest memory location is associated with a virtual device (e.g., is allocated to contain requests from a VM to a virtual device). At block 206, the processing logic can copy a set of data from the encrypted guest memory location to hypervisor memory and create a copied set of encrypted data.

Having created the copied set of encrypted data, the processing logic can, at block 206, access the encrypted memory location again and compare the set of data stored there (i.e., another set of encrypted data which may or may not be identical to the data that was previously there) with the copied set of encrypted data. In some implementations, at block 208, the processing logic can detect whether or not there is a difference between the data in the encrypted memory location and the copied set of encrypted data (i.e., the data copied to the hypervisor memory). If no difference is detected at block 208, the processing logic can, in response, return to block 206, to access the encrypted memory location again and compare the data stored there with the copied set of encrypted data.

If, however, a difference is detected at block 208, the processing logic, can at block 210, receive an unencrypted version of the data comprising a request related to the virtual device. The processing logic can then execute the request related to the virtual device. In some implementations, additional operations and actions can be performed before the processing logic executes the request related to the virtual device. Some of these operations can be understood in more detail with reference to FIG. 3.

Figure 3:
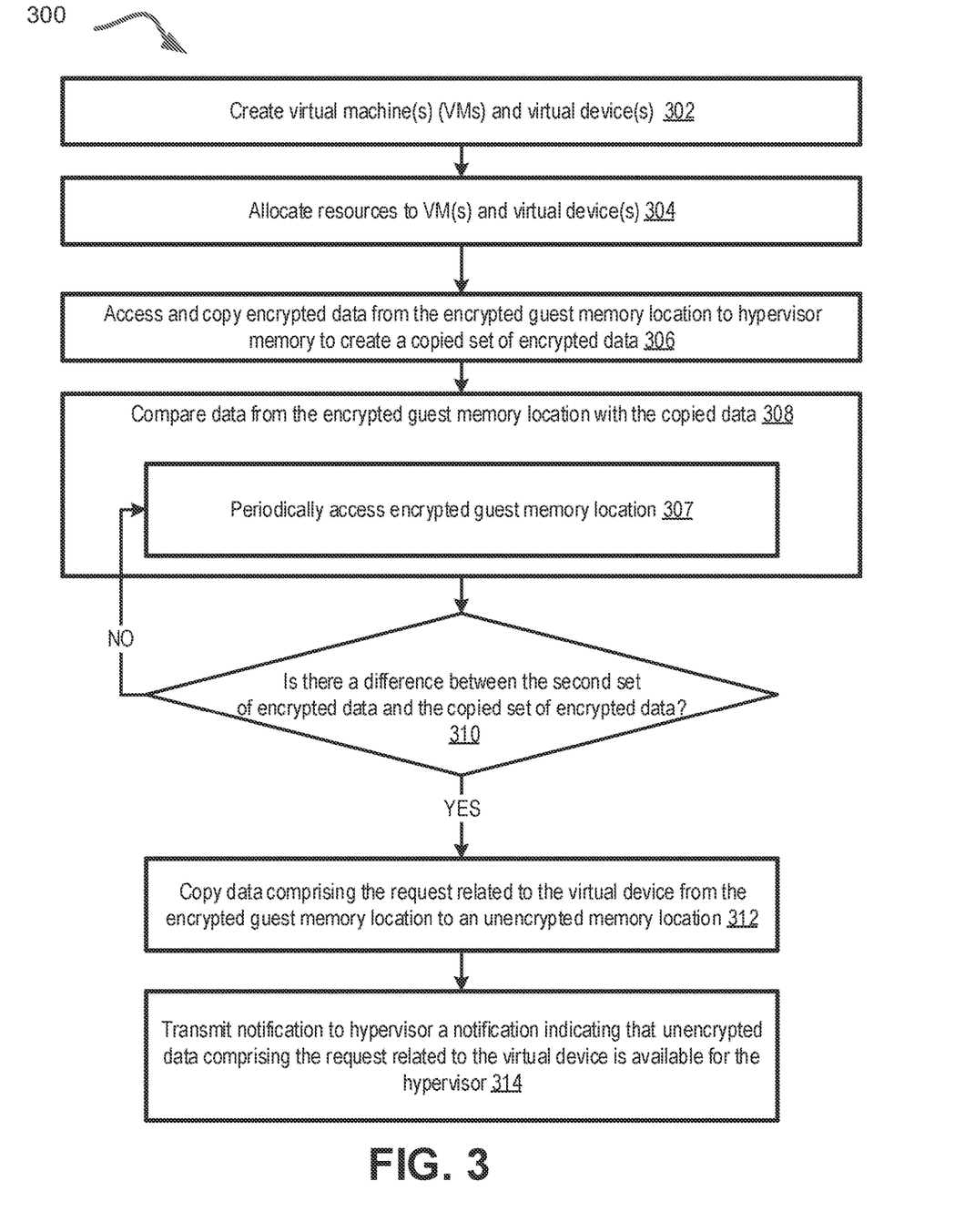
FIG. 3 is a flow diagram of an example method of communication for an encrypted virtual machine, in accordance with one or more implementations of the present disclosure.

FIG. 3 is a flow diagram of an example method of communication for an encrypted virtual machine, in accordance with one or more aspects of the present disclosure. Method 300 can be performed by processing logic that includes hardware (e.g., circuitry, dedicated logic, programmable logic, microcode, etc.), software (e.g., instructions run on a processor to perform hardware simulation), or a combination thereof. Method 300 or each of its individual functions, routines, subroutines, or operations can be performed by one or more processors of a computer system (e.g., the computer system 100 of FIG. 1) implementing the method. In an illustrative example, method 300 can be performed by a single processing thread. Alternatively, method 300 can be performed by two or more processing threads, each thread implementing one or more individual functions, routines, subroutines, or operations of the method. In an illustrative example, the processing threads implementing method 300 can be synchronized (e.g., using semaphores, critical sections, or other thread synchronization mechanisms). Alternatively, the processing threads implementing method 300 can be executed asynchronously with respect to each other. Therefore, while FIG. 3 and the associated description lists the operations of method 300 in certain order, various implementations of the method can perform at least some of the described operations in parallel or in arbitrary selected orders.

Events and operations occurring within the various blocks of method 300 can occur, in some implementations, in any order as well as together with or instead of events and operations occurring within the various blocks of method 200 described earlier. For example, method 300 can begin at block 302, the processing logic (e.g., the processing logic that generates or represents the hypervisor 110) can create one or more VMs and virtual devices. In some implementations, at block 304, the processing logic can (e.g., by the hypervisor), allocate resources to one or more VMs and virtual devices. This can include allocating memory resources to the VM and identifying memory locations where the VM is to store requests relating to one or more virtual devices.

Accordingly, the processing logic can, at block 306, access and copy encrypted data from an encrypted guest memory location (e.g., a location in encrypted guest memory allocated for VM requests to a virtual device) to hypervisor memory (i.e., memory allocated for hypervisor use and operation) to create a copied set of encrypted data. Then, at some later time, the processing logic can, at block 308, compare the data in the encrypted guest memory location (e.g., a location in encrypted guest memory allocated for VM requests to a virtual device) with the copied set of data stored in the hypervisor memory to detect whether any changes have been made. If the VM makes requests related to the virtual device, they can be stored in the location in encrypted memory as encrypted data that is different than the data that was there previously.

At block 310, the processing logic can determine if there is any difference between the set of data that is in the encrypted memory location and the copied set of data stored in hypervisor memory. If it is determined, at block 310, that no difference exists between the set of data that is in the encrypted memory location and the copied set of data stored in hypervisor memory, the processing logic can, in response, return to block 307, where the processing logic can periodically access the encrypted guest memory location and compare, at block 308, the data stored there with the copied set of data stored in hypervisor memory.

However, if at block 310, the processing logic determines that there is a difference between the set of data that is in the encrypted memory location and the copied set of data stored in hypervisor memory, the processing logic can (e.g., via a guest firmware or guest agent executed on the VM by the hypervisor) copy, at block 312, the data comprising the request (e.g., from the VM) relating to the virtual device from the encrypted guest memory location to an unencrypted memory location. In some implementations, the processing logic can, at block 314, transmit a notification (i.e., for the hypervisor to receive) indicating that unencrypted data including the request related to the virtual device is available for the hypervisor to access. In other implementations, the notification sent to and received by the hypervisor can itself include the unencrypted data relating to the virtual device (e.g., include the request from the VM to the virtual device). Accordingly, the processing logic can (e.g., by the hypervisor), access the unencrypted data and execute the request relating to the virtual device (e.g., request by the VM to access or write to the virtual device). These and other aspects of the present disclosure can be better understood with reference to FIG. 4.

Figure 4:
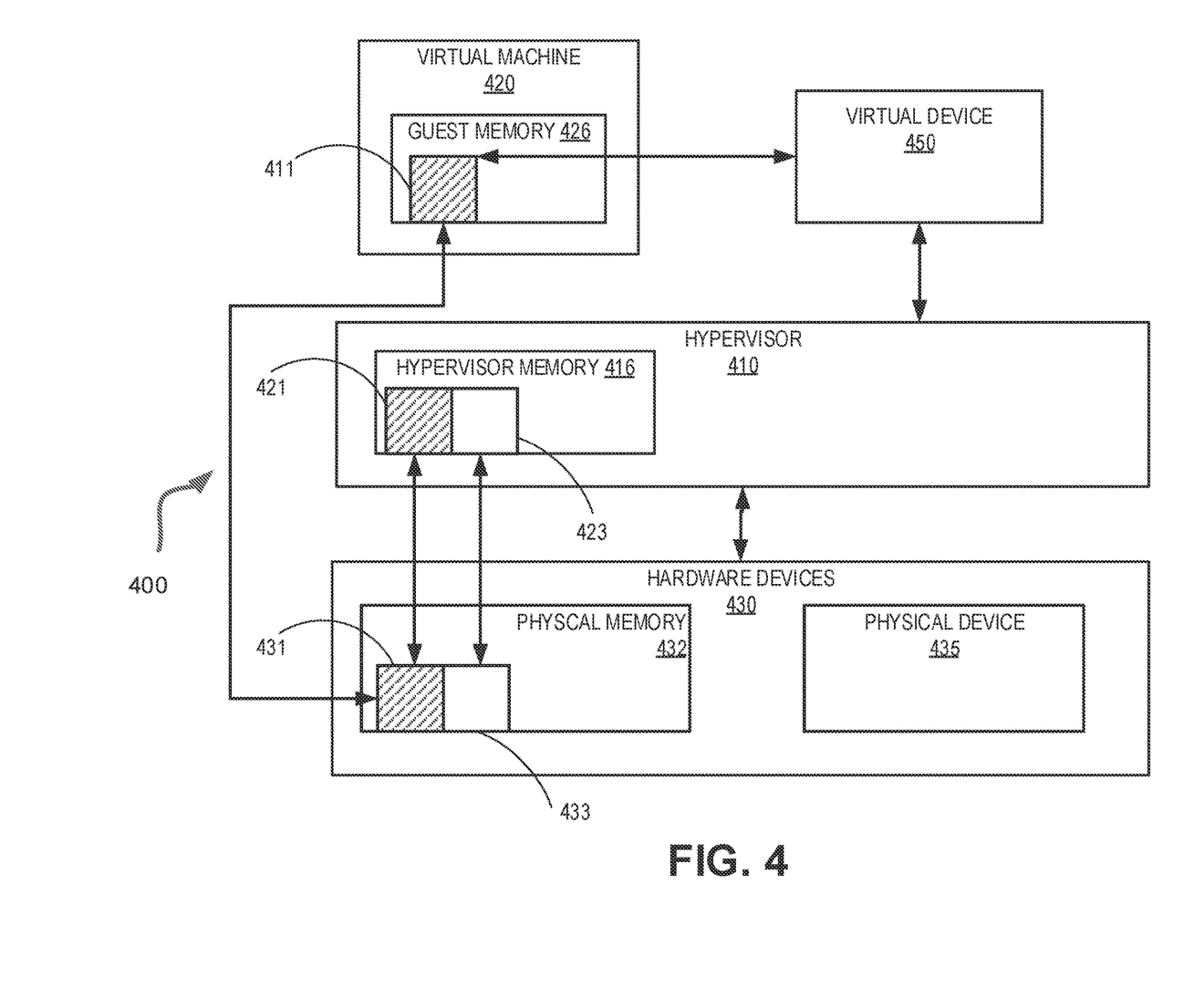
FIG. 4 is a block diagram of a virtualization system, in accordance with one or more implementations of the present disclosure.

FIG. 4 is a block diagram of a virtualization system 400, in accordance with one or more implementations of the present disclosure. In some implementations, virtualization system 400 can be analogous in some respects to computer system 100 of FIG. 1. For example virtualization system 400 can include hypervisor 410, virtual machine 420, virtual device 450, and hardware devices 430. Hardware devices 430 can include physical device 435, which can include a storage device, a networking device, a memory device, an I/O device, or a combination thereof.

The VM 420 can include guest memory 426 allocated to it by the hypervisor 410. The guest memory 426 can be encrypted and can include encrypted memory locations 411 associated with the virtual device 450. For example, portions of the guest memory 426 (e.g., encrypted memory location 411) assigned to the VM 420 by the hypervisor 410, can be dedicated to storing request for the virtual device 150 by the VM 420. In some implementations, the hypervisor can allocate, and therefore map, portions of the quest memory 426 to portions of physical memory 432 (i.e., included as one of the hardware devices 430 of the virtualization system 400). Accordingly, there can be corresponding portions of memory locations such as encrypted guest memory location 411 corresponding to encrypted physical memory location 431. Similarly the hypervisor 410 can associate features and functions of the emulated virtual device 450 with a corresponding physical device 435.

Analogously, the hypervisor 410 can map certain portions of physical memory 432 and their corresponding portions of guest memory 126 (i.e., portions of guest memory residing on encrypted memory locations 431 on physical memory 432) to hypervisor memory 416. Therefore, hypervisor memory 416 can include encrypted memory locations 421 corresponding to encrypted memory location 431 in physical memory 432 (i.e., that is also mapped to encrypted memory location 411 in guest memory 426). In other words, the hypervisor 410 can access the encrypted data stored in the encrypted memory location 411 of guest memory 426 by making a copy of the data stored in a corresponding encrypted memory location 431 into hypervisor memory 416.

The encrypted data can be stored in an unencrypted form in unencrypted memory location 423 in hypervisor memory 416. Accordingly, in some implementations, the set of data containing a request for the virtual device 450 from VM 420 can be copied (e.g., by a guest firmware or guest agent on VM 420) to the unencrypted memory location 423 on hypervisor memory 416. Thus, the hypervisor 410 can access the data containing the request within the unencrypted location 423 (i.e., corresponding to unencrypted memory location 433 of the physical memory 432. The hypervisor 410 can then execute the request relating to the virtual device 450.

Figure 5:
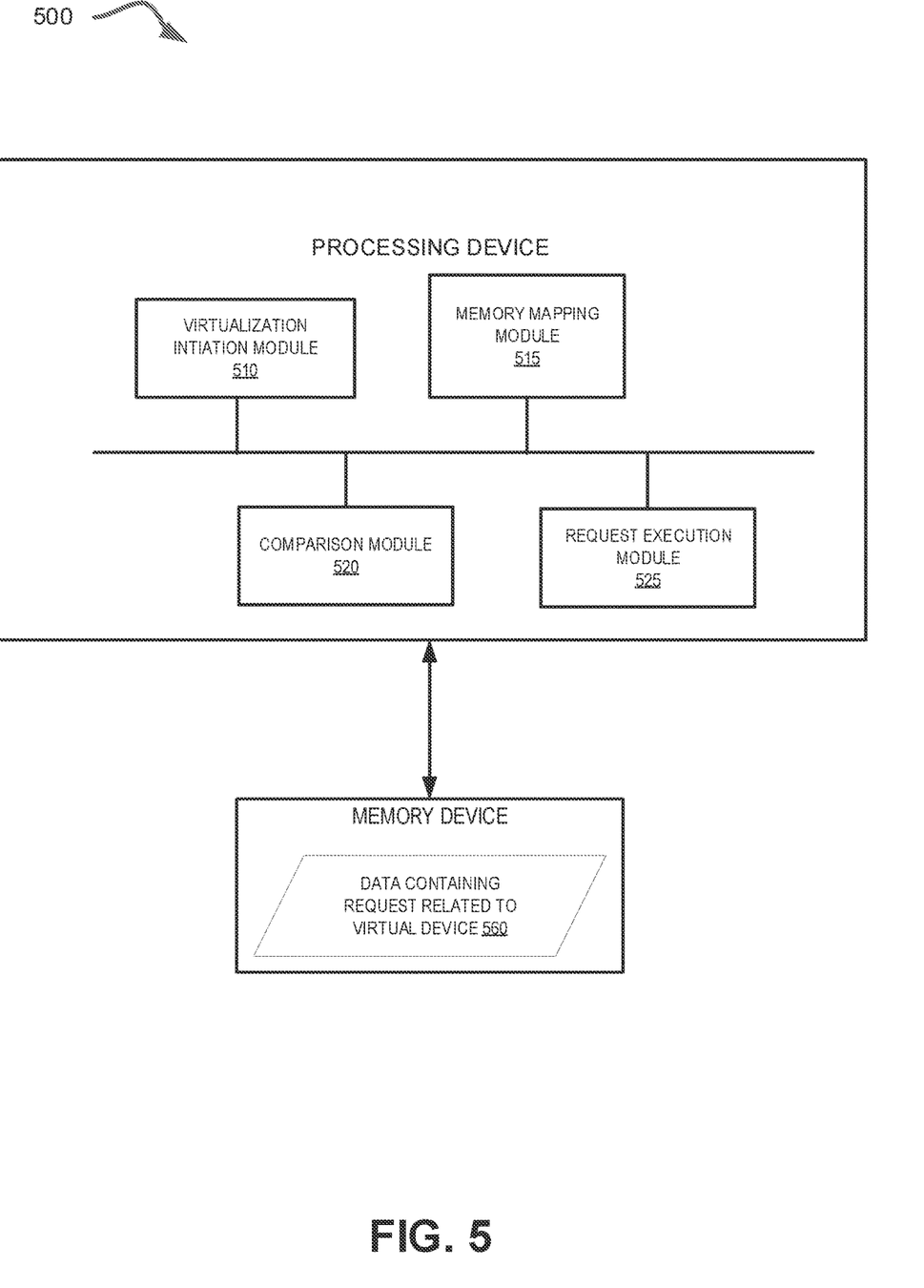
FIG. 5 depicts a block diagram of a computer system operating in accordance with one or more implementations of the present disclosure.

FIG. 5 depicts a block diagram of a computer system 500 operating in accordance with one or more aspects of the present disclosure. Computer system 500 may be the same or similar to computer system 100 of FIG. 1 or computer system 700 of FIG. 7 and may include one or more processing devices and one or more memory devices. In the example shown, computer system 500 may include an access a virtualization initiation module 510, a memory mapping module 515, a comparison module 520, and a request execution module 525 along with a memory device that can include data 560 with requests related to a virtual device.

In some implementations, virtualization initiation module 510 can enable the processing device (e.g. via hypervisor) to create one or more VMs and one or more virtual devices. It can further enable the processor to allocate certain physical hardware resources to the VMs and associate virtual devices with hardware devices. In some implementations, the memory mapping module 515 can enable the processor to allocate memory resources to the VMs and the hypervisor as well as to virtual devices. For example, the memory mapping module 515 can allocate a portion of hardware memory to the VM as guest memory and indicate the portion of guest memory where the VM is to store requests relating to a virtual device. Further the memory mapping module can map the hardware memory location corresponding to the guest memory portion (i.e., encrypted memory location) storing requests relating to a virtual device to a hypervisor memory such that the hypervisor can access the encrypted memory location where requests to the virtual device are stored by the VM.

In some implementations, the comparison module 520 can enable the processing device to compare data 560 stored in an encrypted memory location of a guest memory with a copied set of data previously obtained from the encrypted memory location and copied into hypervisor memory in encrypted form. Further, the comparison module can enable the processing device to periodically access the encrypted memory location and compare the data 560 stored there with the previously copied data set in hypervisor memory.

Accordingly, in some implementations, when a difference is detected between the data sets, the request execution module 525 can enable the processor (e.g. by the hypervisor) to execute the request relating to the virtual device 560. For example, the request execution module 525 can obtain the encrypted data 560 set in the encrypted memory location that is different from the copied data set in hypervisor memory and copy it in unencrypted form to an unencrypted memory location. Further the request execution module can read the request from the VM to a virtual device contained in the data 560 set and execute it.

Figure 6:
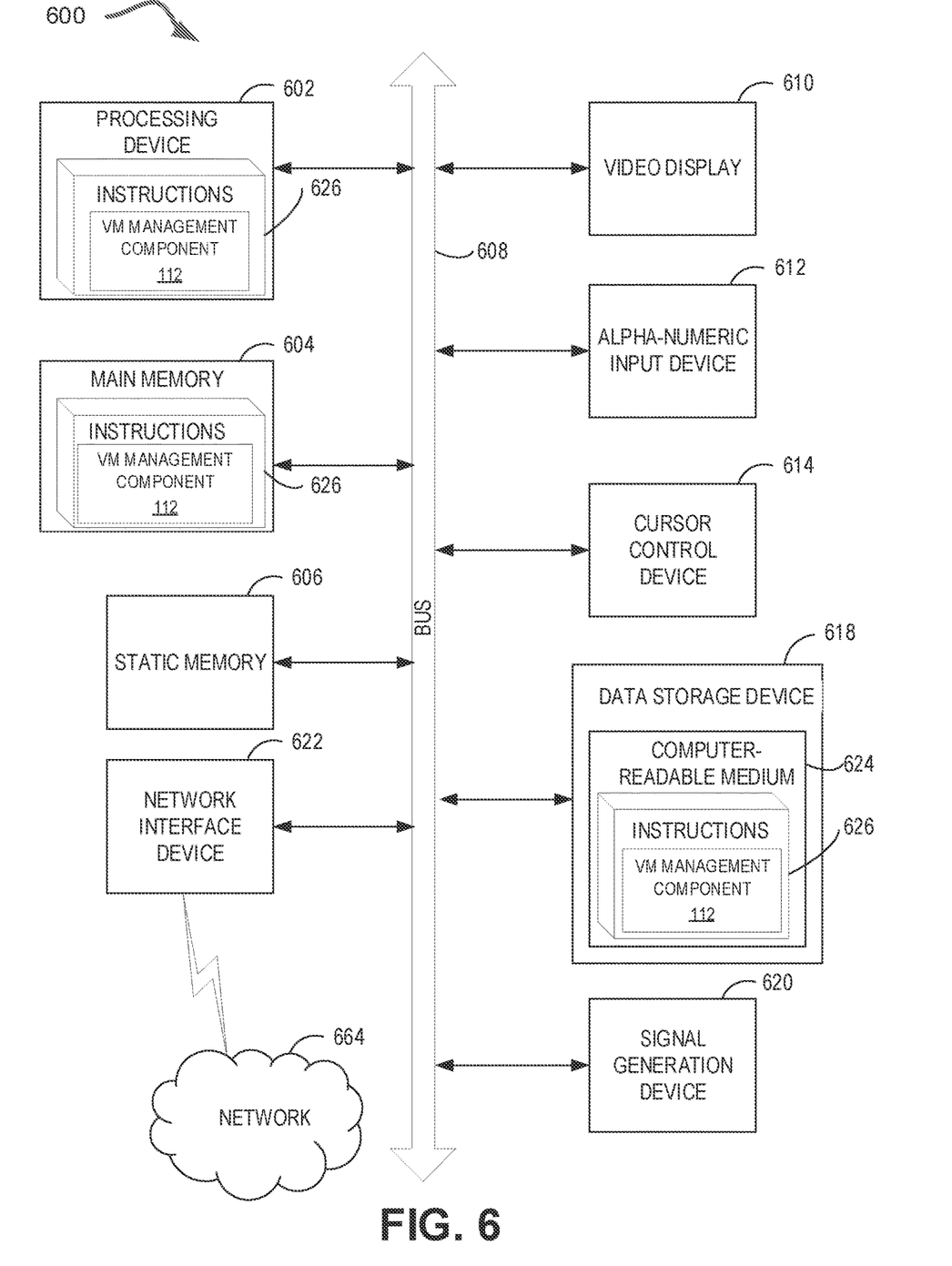
FIG. 6 depicts a block diagram of an illustrative computing device operating in accordance with one or more implementations of the present disclosure.

FIG. 6 depicts a block diagram of a computer system operating in accordance with one or more aspects of the disclosure. In various illustrative examples, computer system 600 can correspond to computer system 100 of FIG. 1 or virtualization system 400. The computer system 600 can be included within a data center that supports virtualization.

Virtualization within a data center results in a physical system being virtualized using VMs and/or containerized applications to consolidate the data center infrastructure and increase operational efficiencies. A VM can be a program-based emulation of computer hardware. For example, the VM can operate based on computer architecture and functions of computer hardware resources associated with hard disks or other such memory. The VM can emulate a physical computing environment, but requests for a hard disk or memory can be managed by a virtualization layer of a host system to translate these requests to the underlying physical computing hardware resources. This type of virtualization results in multiple VMs sharing physical resources.

In certain implementations, computer system 600 can be connected (e.g., via a network, such as a Local Area Network (LAN), an intranet, an extranet, or the Internet) to other computer systems. Computer system 600 can operate in the capacity of a server or a client computer in a client-server environment, or as a peer computer in a peer-to-peer or distributed network environment. Computer system 600 can be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 can include a processing device 602, a volatile memory 604 (e.g., random access memory (RAM)), a non-volatile memory 606 (e.g., read-only memory (ROM) or electrically-erasable programmable ROM (EEPROM)), and a data storage device 618, which can communicate with each other via a bus 608.

Processing device 602 can be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 can further include a network interface device 608. Computer system 600 also can include a video display unit 610 (e.g., an LCD), an alphanumeric input device 612 (e.g., a keyboard), a cursor control device 614 (e.g., a mouse), and a signal generation device 616.

Data storage device 618 can include a non-transitory computer-readable storage medium 624 on which can store instructions 626 embodying any one or more of the methodologies or functions described herein (e.g., VM management component 112 of FIG. 1, and methods 200 and 300 of FIGS. 2 and 3, respectively). Instructions 626 can also reside, completely or partially, within volatile memory 604 and/or within processing device 602 during execution thereof by computer system 600, hence, volatile memory 604 and processing device 602 can also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein can be implemented by discrete hardware components or can be integrated in the functionality of other hardware components such as ASICS, FPGAs, DSPs or similar devices. In addition, the methods, components, and features can be implemented by firmware modules or functional circuitry within hardware devices. Further, the methods, components, and features can be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus can be specially constructed for performing the methods described herein, or it can comprise a general purpose computer system selectively programmed by a computer program stored in the computer system. Such a computer program can be stored in a computer-readable tangible storage medium.

The methods and illustrative examples described herein are not inherently related to any particular computer or other apparatus. Various general purpose systems can be used in accordance with the teachings described herein, or it can prove convenient to construct more specialized apparatus to perform methods 200, and 300, and/or each of their individual functions, routines, subroutines, or operations. Examples of the structure for a variety of these systems are set forth in the description above.

The above description is intended to be illustrative, and not restrictive. Although the disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    identifying, by a hypervisor running on a host computer system, an encrypted guest memory location of a memory of a virtual machine (VM), the encrypted guest memory location associated with a virtual device;
    copying, by the hypervisor, a first set of encrypted data from the encrypted guest memory location to a hypervisor memory that is separate from the memory of the VM to create a copied set of encrypted data in the hypervisor memory;

placing, by a guest operating system of the VM, a request for communication with the virtual device in the encrypted guest memory location to produce a second set of encrypted data at the encrypted guest memory location;

comparing, by the hypervisor, the second set of encrypted data from the encrypted guest memory location with the copied set of encrypted data in the hypervisor memory; and responsive to detecting a difference between the second set of encrypted data and the copied set of encrypted data, requesting, by the hypervisor, unencrypted data comprising the request for communication with the virtual device by the guest operating system, the unencrypted data comprising a decrypted version of the second set of encrypted data.

2. The method of claim 1, further comprising:

accessing, by the hypervisor, the unencrypted data corresponding to the second set of encrypted data in an unencrypted memory location that is accessible by the hypervisor; and executing, by the hypervisor, the request for communication with the virtual device using the unencrypted data.

3. The method of claim 2, further comprising:

responsive to requesting, by the hypervisor, the unencrypted data comprising the request for communication with the virtual device, copying data comprising the request for communication with the virtual device from the encrypted guest memory location to the unencrypted memory location.

4. The method of claim 3, further comprising:

executing, by the hypervisor, a guest agent to copy the data comprising the request for communication with the virtual device from the encrypted guest memory location to the unencrypted memory location.

5. The method of claim 4, further comprising transmitting, by the guest agent, a notification to the hypervisor indicating that the unencrypted data is available for the hypervisor to access.

6. The method of claim 1, wherein comparing the second set of encrypted data from the encrypted guest memory location with the copied set of encrypted data in the hypervisor memory comprises periodically accessing the encrypted guest memory location to detect whether any change has been made to data in the encrypted guest memory location.

7. The method of claim 1, wherein the encrypted guest memory location associated with the virtual device is dedicated to storing requests for the virtual device.

8. A system comprising:

a memory device;

a processing device operatively coupled to the memory device, to perform operations comprising:

identifying, by a hypervisor running on a host computer system, an encrypted guest memory location of a memory of a virtual machine (VM), the encrypted guest memory location associated with a virtual device;

copying, by a hypervisor, a first set of encrypted data from the encrypted guest memory location to a hypervisor memory that is separate from the memory of the VM to create a copied set of encrypted data in the hypervisor memory;

placing, by a guest operating system of the VM, a request for communication with the virtual device in the encrypted guest memory location to produce a second set of encrypted data at the encrypted guest memory location;

comparing, by the hypervisor, the second set of encrypted data from the encrypted guest memory location with the copied set of encrypted data in the hypervisor memory; and responsive to detecting a difference between the second set of encrypted data and the copied set of encrypted data, requesting, by the hypervisor, unencrypted data comprising the request for communication with the virtual device by the guest operating system, the unencrypted data comprising a decrypted version of the second set of encrypted data.

9. The system of claim 8, wherein the operations further comprise:

accessing, by the hypervisor, the unencrypted data corresponding to the second set of encrypted data in an unencrypted memory location that is accessible by the hypervisor; and executing, by the hypervisor, the request for communication with the virtual device using the unencrypted data.

10. The system of claim 9, wherein the operations further comprise:

responsive to requesting, by the hypervisor, the unencrypted data comprising the request for communication with the virtual device, copying data comprising the request for communication with the virtual device from the encrypted guest memory location to the unencrypted memory location.

11. The system of claim 10, wherein the operations further comprise:

executing, by the hypervisor, a guest agent to copy the data comprising the request for communication with the virtual device from the encrypted guest memory location to the unencrypted memory location.

12. The system of claim 11, wherein the operations further comprise transmitting, by the guest agent, a notification to the hypervisor indicating that the unencrypted data is available for the hypervisor to access.

13. The system of claim 8, wherein comparing the second set of encrypted data from the encrypted guest memory location with the copied set of encrypted data in the hypervisor memory comprises periodically accessing the encrypted guest memory location to detect whether any change has been made to data in the encrypted guest memory location.

14. The system of claim 8, wherein the encrypted guest memory location associated with the virtual device is dedicated to storing requests for the virtual device.

15. A non-transitory computer-readable media storing instructions that, when executed, cause a processing device to:

identify, by a hypervisor running on a host computer system, an encrypted guest memory location of a memory of a virtual machine (VM), the encrypted guest memory location associated with a virtual device;

copy, by the hypervisor, a first set of encrypted data from the encrypted guest memory location to a hypervisor memory that is separate from the memory of the VM to create a copied set of encrypted data in the hypervisor memory;

place, by a guest operating system of the VM, a request for communication with the virtual device in the encrypted guest memory location to produce a second set of encrypted data at the encrypted guest memory location;

compare, by the hypervisor, the second set of encrypted data from the encrypted guest memory location with the copied set of encrypted data in the hypervisor memory; and responsive to detecting a difference between the second set of encrypted data and the copied set of encrypted data, request, by the hypervisor, unencrypted data comprising the request for communication with the virtual device by the guest operating system, the unencrypted data comprising a decrypted version of the second set of encrypted data.

16. The non-transitory computer-readable media of claim 15, wherein the instructions further cause the processing device to:

access, by the hypervisor, the unencrypted data corresponding to the second set of encrypted data in an unencrypted memory location that is accessible by the hypervisor; and execute, by the hypervisor, the request for communication with the virtual device using the unencrypted data.

17. The non-transitory computer-readable media of claim 16, wherein the instructions further cause the processing device to:

responsive to requesting, by the hypervisor, the unencrypted data comprising the request for communication with the virtual device, copy data comprising the request for communication with the virtual device from the encrypted guest memory location to the unencrypted memory location.

18. The non-transitory computer-readable media of claim 17, wherein the instructions further cause the processing device to:

execute, by the hypervisor, a guest agent to copy the data comprising the request for communication with the virtual device from the encrypted guest memory location to the unencrypted memory location.

19. The non-transitory computer-readable media of claim 18, wherein the instructions further cause the processing device to transmit, by the guest agent, a notification to the hypervisor indicating that the unencrypted data is available for the hypervisor to access.

20. The non-transitory computer-readable media of claim 15, wherein the encrypted guest memory location associated with the virtual device is dedicated to storing requests for the virtual device.

\* \* \* \* \*